US009846328B2

(12) United States Patent
Son et al.

(10) Patent No.: US 9,846,328 B2
(45) Date of Patent: Dec. 19, 2017

(54) LIQUID CRYSTAL DISPLAY

(71) Applicant: Samsung Display Co., Ltd., Yongin, Gyeonggi-Do (KR)

(72) Inventors: Jeong Man Son, Suwon-si (KR); Jong-Keun Kim, Seoul (KR); Dong Hee Ye, Daegu (KR); Jin Young Lee, Cheonan-si (KR)

(73) Assignee: Samsung Display Co., Ltd. (KR)

(*) Notice: Subject to any disclaimer, the term of this patent is extended or adjusted under 35 U.S.C. 154(b) by 51 days.

(21) Appl. No.: 14/741,184

(22) Filed: Jun. 16, 2015

(65) Prior Publication Data
US 2016/0195786 A1 Jul. 7, 2016

(30) Foreign Application Priority Data

Jan. 7, 2015 (KR) .................. 10-2015-0002077

(51) Int. Cl.
*G02F 1/1343* (2006.01)
*G02F 1/1333* (2006.01)
*G02F 1/1335* (2006.01)
*G02F 1/1362* (2006.01)
*G02F 1/1337* (2006.01)

(52) U.S. Cl.
CPC .... *G02F 1/133512* (2013.01); *G02F 1/13624* (2013.01); *G02F 1/133707* (2013.01); *G02F 2001/134345* (2013.01)

(58) Field of Classification Search
CPC combination set(s) only.
See application file for complete search history.

(56) References Cited

U.S. PATENT DOCUMENTS

| 7,586,580 | B2* | 9/2009 | Matsuda | G02F 1/133308 349/155 |
| 2007/0165149 | A1* | 7/2007 | Kim | G02F 1/134336 349/39 |
| 2008/0204392 | A1* | 8/2008 | Han | G09G 3/3614 345/92 |
| 2011/0128280 | A1* | 6/2011 | Tseng | G02F 1/133512 345/214 |
| 2012/0307172 | A1* | 12/2012 | Yoshida | G02F 1/133707 349/43 |
| 2014/0055696 | A1 | 2/2014 | Lee et al. | |

(Continued)

FOREIGN PATENT DOCUMENTS

| CN | 103631044 | 3/2014 |
| CN | 103901677 | 7/2014 |

(Continued)

*Primary Examiner* — Wen-Ying P Chen
(74) *Attorney, Agent, or Firm* — Innovation Counsel LLP

(57) ABSTRACT

A liquid crystal display includes: a first insulating substrate; thin film transistors positioned on the first insulating substrate, and connected to gate lines and data lines which cross each other while being insulated; pixel electrodes connected to the thin film transistors; a second insulating substrate spaced so as to face the first insulating substrate; light blocking members positioned on the second insulating substrate; a common electrode positioned on the light blocking member; and a liquid crystal layer injected between the pixel electrode and the common electrode, in which one pixel includes the thin film transistor and the pixel electrode, and the plurality of pixels are disposed to be symmetric to a y-axis.

11 Claims, 11 Drawing Sheets

(56) References Cited

U.S. PATENT DOCUMENTS

| | | |
|---|---|---|
| 2014/0176856 A1 | 6/2014 | Lee et al. |
| 2015/0036073 A1 | 2/2015 | Im et al. |
| 2015/0036077 A1 | 2/2015 | Lee et al. |
| 2015/0116621 A1 | 4/2015 | Park et al. |

FOREIGN PATENT DOCUMENTS

| | | |
|---|---|---|
| CN | 104345500 | 2/2015 |
| CN | 104347009 | 2/2015 |
| EP | 2700996 A2 | 2/2014 |
| EP | 2749931 A1 | 7/2014 |
| EP | 2833200 A1 | 2/2015 |
| JP | 2010-008875 | 1/2010 |
| JP | 2014-041320 | 3/2014 |
| JP | 2014-126870 A | 7/2014 |
| JP | 2015-031954 A | 2/2015 |
| KR | 10-2008-0024697 A | 3/2008 |
| KR | 10-2013-0011850 A | 1/2013 |
| KR | 10-2014-0025220 A | 3/2014 |
| KR | 10-2014-0091100 A | 7/2014 |
| KR | 10-2015-0016014 A | 2/2015 |
| KR | 10-2015-0016462 A | 2/2015 |
| KR | 10-2015-0049536 | 5/2015 |

\* cited by examiner

LIQUID CRYSTAL DISPLAY

CROSS-REFERENCE TO RELATED APPLICATION

This application claims priority to and the benefit of Korean Patent Application No. 10-2015-0002077 filed in the Korean Intellectual Property Office on Jan. 7, 2015, the entire contents of which are incorporated herein by reference.

BACKGROUND (a) Field

The present invention relates to a liquid crystal display.

(b) Description of the Related Art

A liquid crystal display (LCD), which is one of the more common types of flat panel displays currently in use, typically includes two sheets of display panels on which electrodes are formed and a liquid crystal layer interposed therebetween. Voltage is applied to the electrodes to form an electric field in the liquid crystal layer, so as to rearrange liquid crystal molecules of the liquid crystal layer, thus controlling the light transmittance through the display panels so as to display images.

The liquid crystal display uses an alignment layer for arranging liquid crystal molecules of the liquid crystal layer in a desired direction. Further, when an electric field is applied to the liquid crystal layer, the liquid crystal molecules are arranged to have a pretilt, in which the alignment layer helps orient the liquid crystal molecules even when the voltage is not applied, in order to pre-determine a direction for a movement of the liquid crystal molecules. For the pretilt of the liquid crystal molecules, a method of mixing reactive mesogen with the liquid crystal layer and performing photopolymerization is known.

Recently, the liquid crystal display has become large, and a curved display panel for improving absorption and tension of a viewer has been developed. However, when the display device is bent, mis-alignment may be incurred between upper and lower substrates, and thus there is a problem in that luminance deteriorates.

The above information disclosed in this Background section is only for enhancement of understanding of the background of the disclosure and therefore it may contain information that does not form the prior art that is already known to a person of ordinary skill in the art.

SUMMARY

A difference in a display quality at left and right sides of a display device generated when upper and lower panels are mis-aligned due to a curve of the display device is decreased, to improve display quality.

In one aspect, a liquid crystal display includes: a first insulating substrate; thin film transistors positioned on the first insulating substrate, and connected to gate lines and data lines which cross each other while being insulated; pixel electrodes connected to the thin film transistors; a second insulating substrate spaced so as to face the first insulating substrate; light blocking members positioned on the second insulating substrate; a common electrode positioned on the light blocking member; and a liquid crystal layer injected between the pixel electrode and the common electrode, in which one pixel includes the thin film transistor and the pixel electrode, and the plurality of pixels are disposed to be symmetric to a y-axis.

The liquid crystal display may have a curved shape, and in the one pixel, an extension direction of the gate line may be an elongated side.

The pixel electrode may include a first subpixel electrode and a second subpixel electrode, and the first subpixel electrode and the second subpixel electrode may be positioned while being spaced apart from each other based on the thin film transistor.

One pixel positioned in one column may be symmetric to one pixel positioned in another adjacent column in the data line.

In each of the plurality of pixels disposed in the extension direction of the gate line, the first subpixel electrode and the second subpixel electrode may be alternately disposed.

The first subpixel electrode positioned in one row may be positioned at one side of the data line, and the first subpixel electrode positioned in another adjacent row may be positioned at the other side of the data line.

The light blocking member overlapping the pixel positioned in one column may overlap the second subpixel electrode, and the light blocking member overlapping the pixel positioned in another adjacent column may overlap the first subpixel electrode.

The light blocking member may alternately overlap any one of the first subpixel electrode and the second subpixel electrode.

The light blocking members adjacent in the extension direction of the data line may be connected with each other.

The light blocking member may be independently formed for each pixel.

The light blocking member may be positioned while overlapping the thin film transistor.

The liquid crystal display may further include color filters positioned on the second insulating substrate, and having the same color in the extension direction of the gate line.

The liquid crystal display may further include an overcoat positioned on the color filter and the light blocking member.

According to the aforementioned liquid crystal display, it is possible to provide a uniform image quality at left and right sides of the display device even when mis-alignment is incurred between upper and lower panels due to a curve of the display device, thereby providing a display device having an improved image quality.

DETAILED DESCRIPTION OF THE EMBODIMENTS

Figure 1:
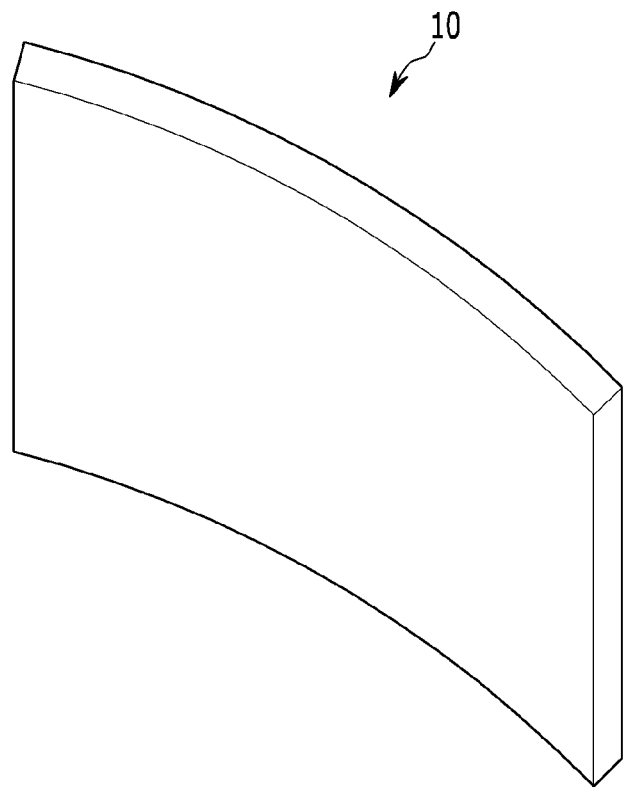
FIG. 1 is a perspective view of a display device according to an example embodiment.

Example embodiments will be described more fully hereinafter with reference to the accompanying drawings, in which example embodiments of the disclosure are shown.

As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element, or intervening elements may also be present. In contrast, when an element is referred to as being "directly on" another element, there are no intervening elements present.

Hereinafter, a liquid display device according to an example embodiment will be described with reference to FIGS. 1 to 4. FIG. 1 is a perspective view of a display device according to an example embodiment, FIG. 2 is a schematic top plan view of the display device according to an example embodiment, FIG. 3A is a top plan view of one pixel electrode according to an example embodiment, FIG. 3B is a cross-sectional view of a region Tr according to an example embodiment, and FIG. 4 is a circuit diagram of one pixel according to an example embodiment.

As illustrated in FIG. 1, a liquid display device 10 according to an example embodiment may be a curved display device. In the present specification, the liquid crystal display curved in an elongated side direction will be described, but the present disclosure is not limited thereto, and a liquid crystal display curved in a short side direction may also be adopted.

The liquid crystal display 10 illustrated in FIG. 1 is curved in the elongated side direction, so that mis-alignment is generated between upper and lower panels. Accordingly, constituent elements arranged in a flat panel display device are mis-aligned in left and right directions. Particularly, there occurs the mis-alignment that a right region is further biased to the right and a left region is further biased to the left based on a center of a display device viewed by a user. That is, based on the lower panel, constituent elements of the upper panel positioned in a right region are further biased to the right, and constituent elements of the upper panel positioned in a left region are further biased to the left.

Figure 2:
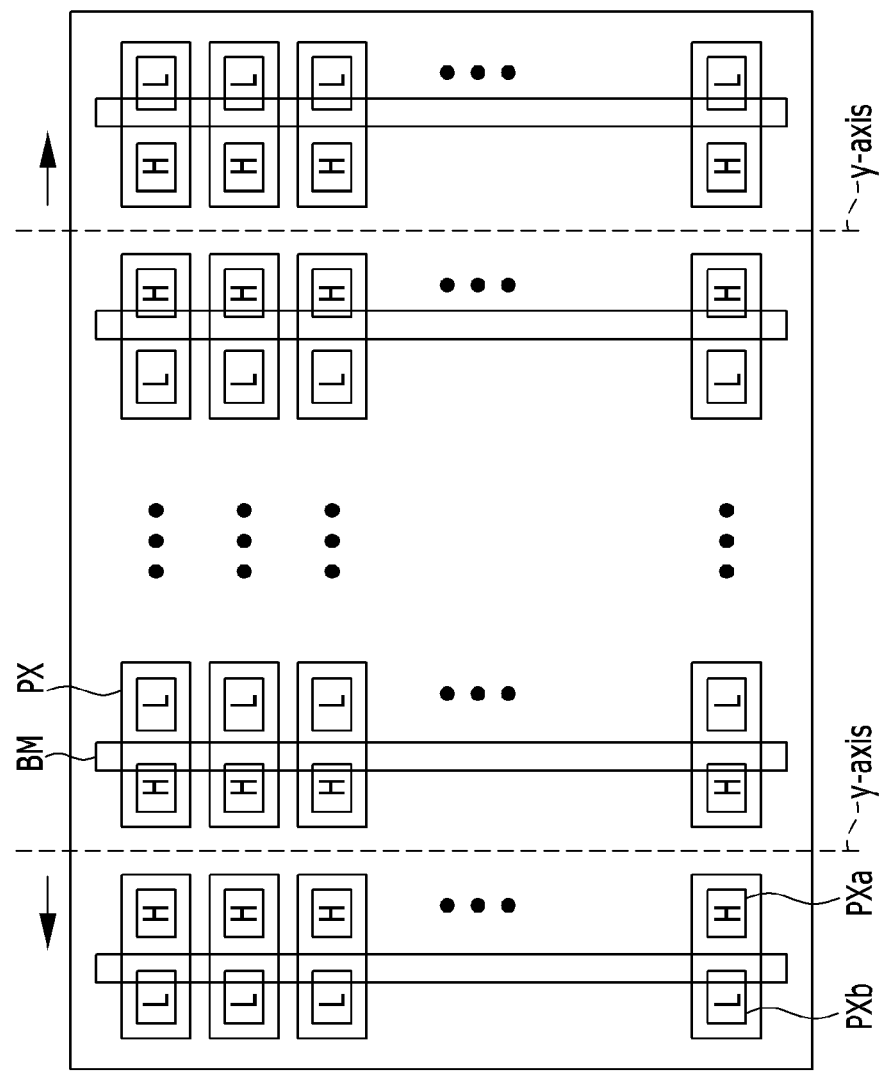
FIG. 2 is a schematic top plan view of the display device according to an example embodiment.
Figure 3A:
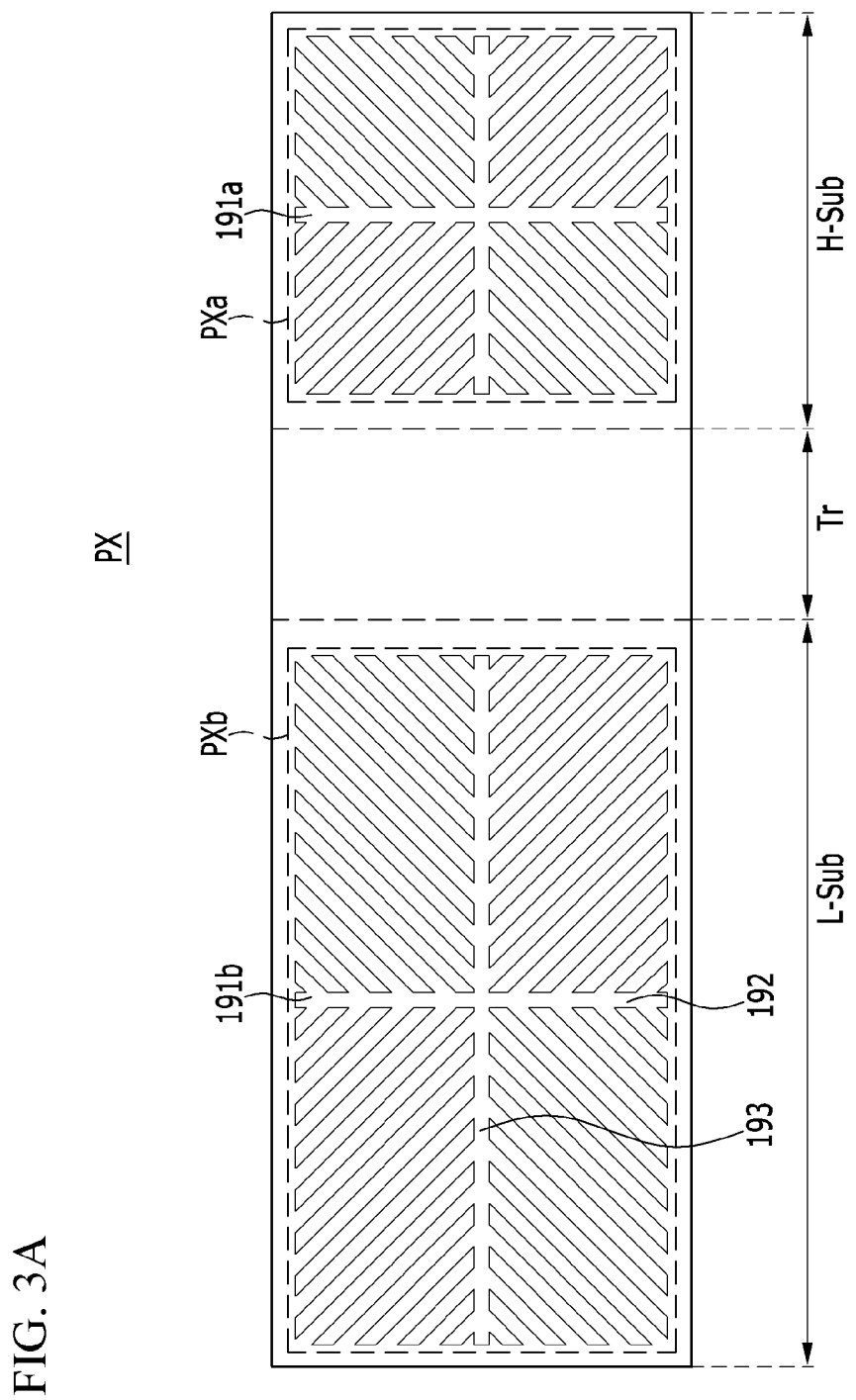
FIG. 3A is a top plan view of one pixel electrode according to an example embodiment.
Figure 3B:
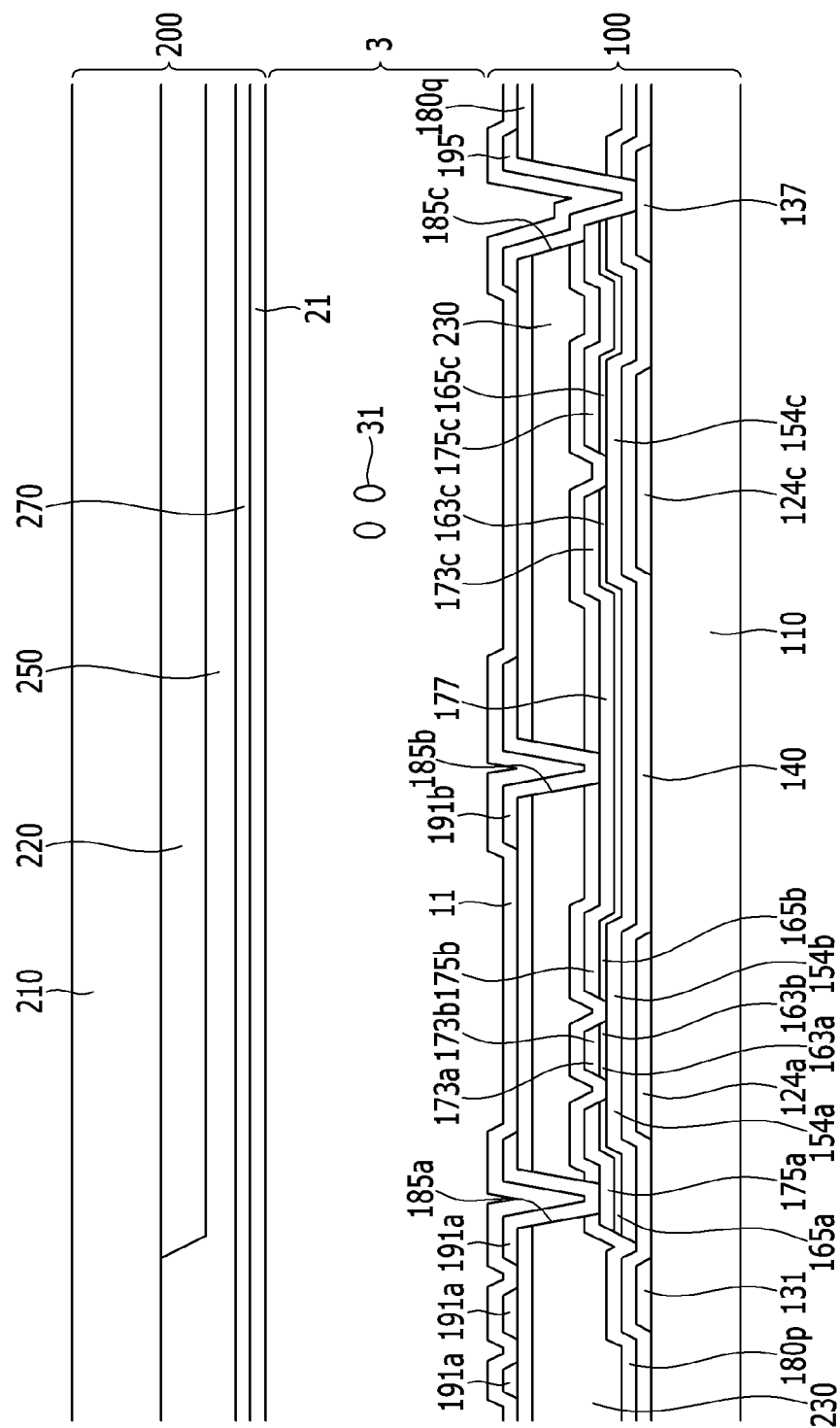
FIG. 3B is a cross-sectional view of a region Tr according to an example embodiment.
Figure 4:
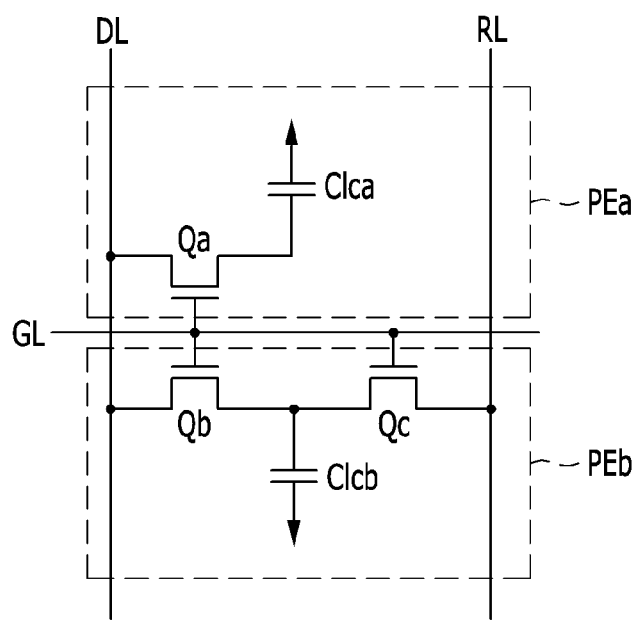
FIG. 4 is a circuit diagram of one pixel according to an example embodiment.

Referring to FIGS. 2 to 4, the display device according to an example embodiment includes a plurality of pixels PX disposed in a matrix form, and one pixel PX includes one thin film transistor and a pixel electrode. One pixel electrode may include a first subpixel electrode 191a receiving a first voltage and a second subpixel electrode 191b receiving a second voltage, and the first voltage may be larger than the second voltage. Accordingly, according to an example embodiment, the first subpixel electrode receiving the first voltage forms a high gray region H, and the second subpixel electrode receiving the second voltage forms a low gray region L.

According to an example embodiment illustrated in FIG. 2, in one pixel positioned in one column, the high gray region H may be positioned at a right side of a light blocking member BM (220 in FIG. 3B), and the low gray region L may be positioned at a left side of the light blocking member BM. Further, in one pixel positioned in another column adjacent to the one column, the high gray region H may be positioned at a left side of the light blocking member BM, and the low gray region L may be positioned at a right side of the light blocking member BM. That is, the plurality of pixels according to an example embodiment may be symmetrically disposed, and particularly, the display device curved in the elongated side direction may include the plurality of pixels disposed to be symmetric to a y-axis.

Particularly, in reviewing the left region of the liquid crystal display, the position of the black matrix BM on upper panel is shifted to the left, so that the light blocking member BM positioned on the upper panel is not positioned precisely between the two regions L and H of the pixel PX, but is shifted to the left with respect to the position of the two regions of the pixel PX.

In one column, the light blocking member BM moved to the left partially overlaps the low gray region L positioned at the left side of the light blocking member BM for the plurality of pixels positioned in the one column. By contrast, in another column adjacent to the one column, the light blocking member BM moved to the left overlaps the high gray region H positioned at the left side of the light blocking member BM for the plurality of pixels positioned in the another adjacent column.

That is, when the light blocking member BM is generally shifted to the left in the left region of the display device, which is the half of the display device on the left side of an imaginary vertical center, y-axis line the high gray region H and the low gray region L are symmetrically disposed, so that the light blocking member BM hides the low gray region L in the one column and the high gray region H in the another adjacent column. Accordingly, when the display device is curved, the light blocking member BM alternately hides a portion of the high gray region H and a portion of the low gray region L, so that the display device may provide a generally uniform display quality.

Next, in reviewing the right region of the display device, the position of the black matrix BM positioned on the upper panel is shifted to the right, so that the light blocking member BM positioned on the upper panel is not positioned precisely between the two regions L and H of the pixel PX, but is shifted to the right with respect to the position of the two regions of the pixel PX, similar to the left region. In one column of the plurality of pixels positioned in the right region, the light blocking member BM moved to the right partially overlaps the high gray region H positioned at the right side of the light blocking member BM for the plurality of pixels positioned in the one column. Further, in another column adjacent to the one column, the light blocking member BM moved to the right partially overlaps the low gray region H positioned at the right side of the light blocking member 220 for the plurality of pixels positioned in the another adjacent column.

That is, when the light blocking member BM is generally shifted to the right, the light blocking member BM hides a portion of the low gray region L in the one column and a portion of the high gray region H in the another adjacent column through the high gray region H and the low gray region L which are symmetrically disposed.

Accordingly, on a display device according to an example embodiment that is curved, the light blocking member BM shifted as illustrated in FIG. 2 alternately hides the high gray region H and the low gray region L, thereby providing a generally uniform display quality.

Hereinafter, one pixel of the liquid crystal display according to an example embodiment will be described in detail with reference to FIGS. 3A and 3B. Particularly, a cross-section of a thin film transistor region Tr illustrated in FIG. 3A will be described with reference to FIG. 3B.

The liquid crystal display according to the present example embodiment includes a lower panel 100 and an upper panel 200 which face each other, a liquid crystal layer 3 which is disposed between the two panels 100 and 200 and includes liquid crystal molecules 31, and a pair of polarizers (not illustrated) which are attached onto external surfaces of the panels 100 and 200.

First, the lower panel 100 will be described.

A gate conductor including a gate line including gate electrodes 124a, 124b, and 124c and a voltage division reference voltage line 131 are positioned on a first insulating substrate 110 formed of transparent glass, plastic, and the like.

The gate line includes a first gate electrode 124a, a second gate electrode 124b, a third gate electrode 124c, and a wide end portion (not illustrated) for connection with another layer or an external driving circuit. The voltage division reference voltage line 131 includes a first storage electrode (not illustrated) and a reference electrode 137. A second storage electrode (not illustrated), which is not connected to the voltage division reference voltage line 131 but overlaps the second subpixel electrode 191b, is positioned on a first insulating substrate 110.

A gate insulating layer 140 is positioned on the gate line 121 and the voltage division reference voltage line 131, and a first semiconductor layer 154a, a second semiconductor layer 154b, and a third semiconductor layer 154c are positioned on the gate insulating layer 140. A plurality of ohmic contacts 163a, 165a, 163b, 165b, 163c, and 165c is positioned on the semiconductor layers 154a, 154b, and 154c.

Data conductors including a plurality of data lines 171 including a first source electrode 173a and a second source electrode 173b, a first drain electrode 175a, a second drain electrode 175b, a third source electrode 173c, and a third drain electrode 175c are positioned on the ohmic contacts 163a, 165a, 163b, 165b, 163c, and 165c and the gate insulating layer 140. The data conductor, and the semiconductors and the ohmic contacts positioned under the data conductors may be simultaneously formed by using one mask. The data line 171 may include a wide end portion (not illustrated) for connection with another layer or an external driving circuit, and include the semiconductor layers 154a, 154b, and 154c and the ohmic contacts 163a, 165a, 163b, 165b, 163c, and 165c having the same plane form.

The first gate electrode 124a, the first source electrode 173a, and the first drain electrode 175a form a first thin film transistor Qa together with the first semiconductor layer 154a, and a channel of the thin film transistor is formed in the first semiconductor layer 154a between the first source electrode 173a and the first drain electrode 175a. Similarly, the second gate electrode 124b, the second source electrode 173b, and the second drain electrode 175b form a second thin film transistor Qb together with the second semiconductor layer 154b, and a channel of the thin film transistor is formed in the second semiconductor layer 154b between the second source electrode 173b and the second drain electrode 175b. The third gate electrode 124c, the third source electrode 173c, and the third drain electrode 175c form a third thin film transistor Qc together with the third semiconductor layer 154c, and a channel of the thin film transistor is formed in the third semiconductor layer 154c between the third source electrode 173c and the third drain electrode 175c. The second drain electrode 175b is connected with the third source electrode 173c, and includes a widely expanded portion 177.

A first passivation layer 180p is positioned on the data conductors 171, 173c, 175a, 175b, 175c and the exposed portions of the semiconductor layers 154a, 154b, and 154c.

A first contact hole 185a and a second contact hole 185b, through which the first drain electrode 175a and the second drain electrode 175b are exposed, are positioned in the first passivation layer 180p. A third contact hole 185c, through which a part of the reference electrode 137 and a part of the third drain electrode 175c are exposed, is formed in the first passivation layer 180p and the gate insulating layer 140, and the third contact hole 185c is covered with a connecting member 195. The connecting member 195 electrically connects the reference electrode 137 and the third drain electrode 175c exposed through the third contact hole 185c.

Color filters 230 are positioned on the first passivation layer 180p. The color filters 230 are extended along two adjacent data lines in a vertical direction. The two adjacently positioned color filters 230 may be spaced apart from each other based on the data line 171 or overlap in a region adjacent to the data line 171.

The color filter 230 may intrinsically display any one of the primary colors, and examples of the primary colors may include three primary colors, such as red, green, and blue, or yellow, cyan, magenta, or the like. Although not illustrated in the drawings, the color filter may further include a color filter displaying a mixed color of the primary colors or white in addition to the primary colors.

A second passivation layer 180q is positioned on the color filters 230. The second passivation layer 180q may be made of the same material of that of the first passivation layer 180p.

Pixel electrodes 191 are positioned on the second passivation layer 180q. Each pixel electrode 191 includes the first subpixel electrode 191a and the second subpixel electrode 191b which are separated from each other with the gate line 121 interposed therebetween and adjacent to each other in a column direction based on the gate line 121. The pixel electrode 191 may be made of a transparent conductive material, such as an indium tin oxide (ITO) or an indium zinc oxide (IZO), or reflective metal, such as aluminum, silver, chromium or an alloy thereof.

The first subpixel electrode 191a and the second subpixel electrode 191b may have an electrodes shape as illustrated in FIG. 3A. A region in which the first subpixel electrode 191a is positioned may exhibit a high gray H-Sub, and a region in which the second subpixel electrode 191b may exhibit a low gray L-Sub.

The first pixel electrode 191a and the second pixel electrode 191b are physically and electrically connected with the first drain electrode 175a and the second drain electrode 175b through the first contact hole 185a and the second contact hole 185b, respectively, and receive a data voltage from the first drain electrode 175a and the second drain electrode 175b, respectively. A part of the data voltage applied to the second drain electrode 175b is divided through the third source electrode 173c, so that a size of the voltage applied to the first subpixel electrode 191a is larger than a size of the voltage applied to the second subpixel electrode 191b.

The first subpixel electrode 191a and the second subpixel electrode 191b to which the data voltage is applied generate an electric field in conjunction with a common electrode 270 of the upper panel 200, thereby determining a direction of the liquid crystal molecule of the liquid crystal layer 3 between the two electrodes 191 and 270. The luminance of light passing through the liquid crystal layer 3 is changed according to the direction of the liquid crystal molecules determined as described above.

A lower alignment layer 11 is positioned on the pixel electrode 191.

Next, the upper panel 200 will be described.

The light blocking member 220 is positioned on an insulating substrate 210. The light blocking member 220 is also called a black matrix (BM) and prevents light leakage. The light blocking member 220 may be positioned in a region corresponding to the gate line 121 and the data line 171.

The light blocking member 220 according to an example embodiment may be equal or similar to the light blocking member described with reference to FIG. 2.

An overcoat 250 is positioned on the light blocking member 220. The overcoat 250 may be formed of an organic insulating material, and provides a flat surface. The overcoat 250 may be omitted according to an example embodiment.

The common electrode 270 is positioned on the overcoat 250. The common electrode 270 may be made of a transparent conductor, such as an ITO and an IZO.

An upper alignment layer 21 is positioned on the common electrode 270.

The liquid crystal layer 3 includes the plurality of liquid crystal molecules 31, and the liquid crystal molecules 31 are aligned to be vertical, i.e., having a long axis that is perpendicular, to surfaces of the two panels 110 and 210 in a state where a voltage is not applied to the two field generating electrodes 191 and 270, and are aligned so as to have a pretilt inclined in the same direction as a longitudinal direction of a cut pattern of the pixel electrode 191.

The liquid crystal layer 3 or the alignment layers 11 and 21 according to an example embodiment may not include reactive mesogen (RM). Because the pixel electrode improves control force of the liquid crystal molecules of the lower panel by adjusting a width of a fine slit and a fine branch portion, it is possible to control the liquid crystal even without separate reactive mesogen. An UV electric field process may be omitted in a process of manufacturing the display device including no reactive mesogen.

Hereinafter, a basic electrode of the pixel electrode 191 will be described with reference to FIG. 3A.

As illustrated in FIG. 3A, a general shape of the basic electrode is a quadrangle, and includes a cross-shaped stem portion including a horizontal stem portion 193 and a vertical stem portion 192 orthogonal to the horizontal stem portion 193. Further, the basic electrode is divided into a first sub region Da, a second sub region Db, a third sub region Dc, and a fourth sub region Dd by the horizontal stem portion 193 and the vertical stem portion 192, and each of the first to fourth sub regions Da, Db, Dc, and Dd includes a plurality of first fine branch portions 194a, a plurality of second fine branch portions 194b, a plurality of third fine branch portions 194c, and a plurality of fourth fine branch portions 194d. Fine slits 195a, 195b, 195c, and 195d are positioned between the fine branch portions 194a, 194b, 194c, and 194d in the quadrangular shape of the basic electrode. That is, the fine slits 195a, 195b, 195c, and 195d are regions from which the conductor forming the cross-shaped stem portion and the fine branch portion is removed, and are intervals between the adjacent fine branch portions 194a, 194b, 194c, and 194d The first fine branch portion 194a is obliquely extended in an upper left direction from the horizontal stem portion 193 or the vertical stem portion 192, and the second fine branch portion 194b is obliquely extended in an upper right direction from the horizontal stem portion 193 or the vertical stem portion 192. The third fine branch portion 194c is extended in a lower left direction from the horizontal stem portion 193 or the vertical stem portion 192, and the fourth fine branch portion 194d is obliquely extended in a lower right direction from the horizontal stem portion 193 or the vertical stem portion 192.

The first to fourth fine branch portions 194a, 194b, 194c, and 194d form an angle of approximately 45° or 135° with respect to gate lines 121a and 121b or the horizontal stem portion 193. Further, the fine branch portions 194a, 194b, 194c, and 194d of the two adjacent sub regions Da, Db, Dc, and Dd may be orthogonal to each other.

The first subpixel electrode 191a and the second subpixel electrode 191b are connected with the first drain electrode 175a and the second drain electrode 175b through the first contact hole 185a and the second contact hole 185b, respectively, and receive a data voltage from the first drain electrode 175a and the second drain electrode 175b, respectively. In this case, sides of the first to the fourth fine branch portions 194a, 194b, 194c, and 194d distort an electric field to make a horizontal component which determines an inclination direction of the liquid crystal molecules 31. The horizontal components of the electric field are almost horizontal to the sides of the first to fourth fine branch portions 194a, 194b, 194c, and 194d. Accordingly, the liquid crystal molecules 31 are inclined in a direction parallel to a longitudinal direction of the fine branch portions 194a, 194b, 194c, and 194d. Because one pixel electrode 191 includes four sub regions Da to Dd in which longitudinal directions of the fine branch portions 194a, 194b, 194c, and 194d are different from each other, the inclination directions of the liquid crystal molecules 31 are about four directions, and four domains, in which the alignment directions of the liquid crystal molecules 31 are different from each other, are formed in the liquid crystal layer 3. As described above, if the inclination direction of the liquid crystal molecules is varied, a reference viewing angle of the liquid crystal display is increased.

FIG. 4 is an equivalent circuit diagram of one pixel of the liquid crystal display according to an example embodiment. Signal lines, a disposition of the pixels, and a driving method of the curved display device according to an example embodiment will be described with reference to FIG. 4.

One pixel PX of the liquid crystal display may include a plurality of signal lines including a gate line GL for transmitting a gate signal, a data line DL for transmitting a data signal, and a voltage division reference voltage line RL for transmitting a voltage division reference voltage, first, second, and third switching elements Qa, Qb, and Qc connected to the plurality of signal lines, and first and second liquid crystal capacitors Clca and Clcb.

The first switching element Qa and the second switching element Qb are connected to the gate line GL and the data line DL, respectively, and the third switching element Qc is connected to an output terminal of the second switching element Qb and the voltage division reference voltage line RL. The first switching element Qa and the second switching element Qb are three-terminal elements, such as a thin film transistor, and a control terminal thereof is connected to the gate line GL and an input terminal thereof is connected to the data line DL. An output terminal of the first switching element Qa is connected to the first liquid crystal capacitor Clca, and an output terminal of the second switching element Qb is connected to the second liquid crystal capacitor Clcb and an input terminal of the third switching element Qc. The third switching element Qc is also the three-terminal element, such as a thin film transistor, a control terminal thereof is connected to the gate line GL, an input terminal thereof is connected to the second liquid crystal capacitor Clcb, and an output terminal thereof is connected to the voltage division reference voltage line RL.

When a gate-on signal is applied to the gate line GL, the first switching element Qa, the second switching element Qb, and the third switching element Qc, which are connected to the gate line GL, are turned on. As a result, the data voltage applied to the data line DL is applied to a first subpixel electrode PEa and a second subpixel electrode PEb through the first switching element Qa and the second switching element Qb which are turned on. The data voltages applied to the first subpixel electrode PEa, which may be, for example H-Sub, and the second subpixel electrode PEb, which may be, for example, L-Sub, are the same as each other, so that the first liquid crystal capacitor Clca and the second liquid crystal capacitor Clcb are charged with the same value as the difference between the common voltage and the data voltage, but the voltage charged in the second liquid crystal capacitor Clcb is divided through the turned-on third switching element Qc at the same time. Accordingly, the voltage charged in the second liquid crystal capacitor Clcb is decreased by a difference between the common voltage and the voltage division reference voltage.

Because the voltage charged in the first liquid crystal capacitor Clca and the voltage charged in the second liquid crystal capacitor Clcb become different from each other, inclination angles of liquid crystal molecules in the first subpixel electrode and the second subpixel electrode become different from each other, and accordingly, luminance of the two subpixels become different from each other. When the voltage of the first liquid crystal capacitor Clca and the voltage of the second liquid crystal capacitor Clcb are appropriately adjusted, it may be possible to make an image viewed at a lateral side maximally similar to an image viewed at a front side, thereby improving side visibility.

In the illustrated example embodiment of FIG. 4, in order to make the voltage charged in the first liquid crystal capacitor Clca and the voltage charged in the second liquid crystal capacitor Clcb be different from each other, the third switching element Qc connected to the second liquid crystal capacitor Clcb and the voltage division reference voltage line RL is included, but various embodiments may be differently configured example. For example, the second liquid crystal capacitor Clcb may be connected to a step-down capacitor. Particularly, the liquid crystal display includes the third switching element including a first terminal connected to a step-down gate line, a second terminal connected to the second liquid crystal capacitor Clcb, and a third terminal connected to the step-down capacitor, and a part of the amount of charge charged in the second liquid crystal capacitor Clcb is charged in the step-down capacitor, so that the charging voltages between the first liquid crystal capacitor Clca and the second liquid crystal capacitor Clcb may be differently set. For another example, the first liquid crystal capacitor Clca and the second liquid crystal capacitor Clcb are connected to the different data lines, respectively, and receive different data voltages, so that the charging voltages between the first liquid crystal capacitor Clca and the second liquid crystal capacitor Clcb may be differently set.

In the present specification, the circuit diagram illustrated in FIG. 4 has been described, but the present disclosure is not limited thereto, and the pixel electrode structure of the present disclosure may be equally applied to various structures.

Figure 5:
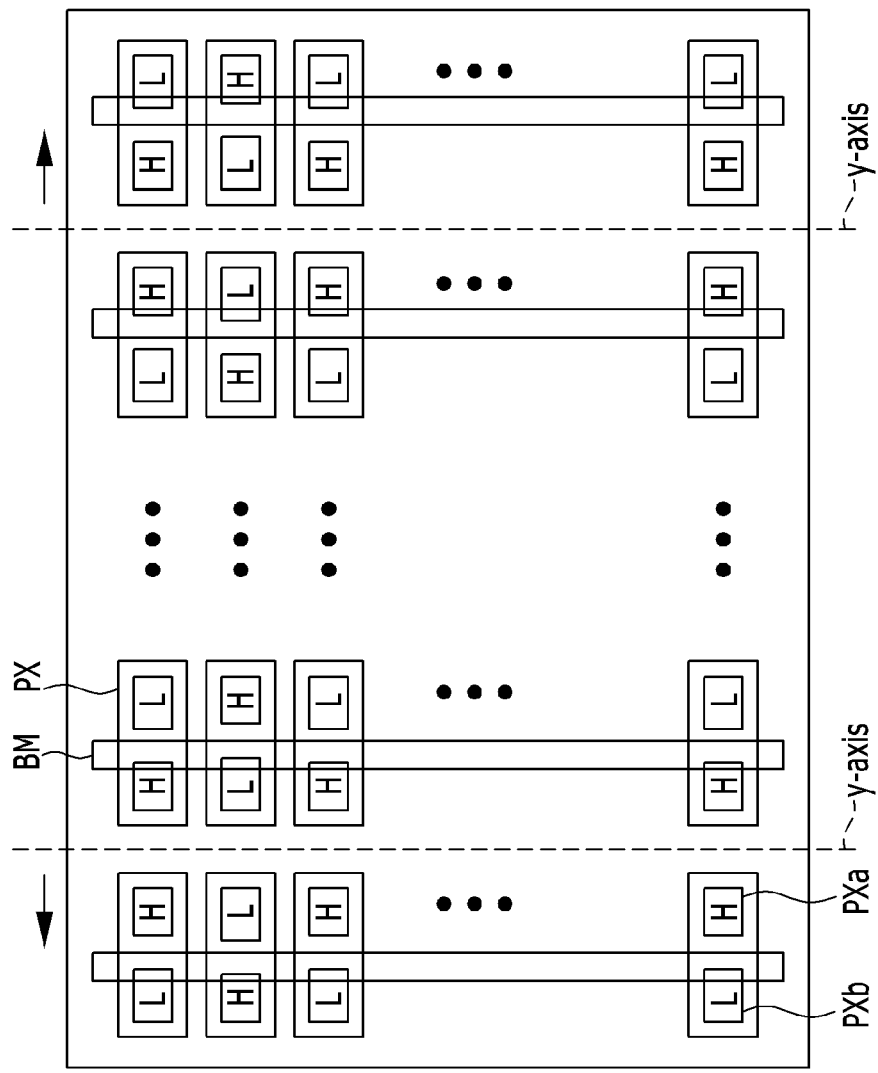
FIGS. 5 and 6 are schematic top plan views of a display device according to another example embodiment.
Figure 6:
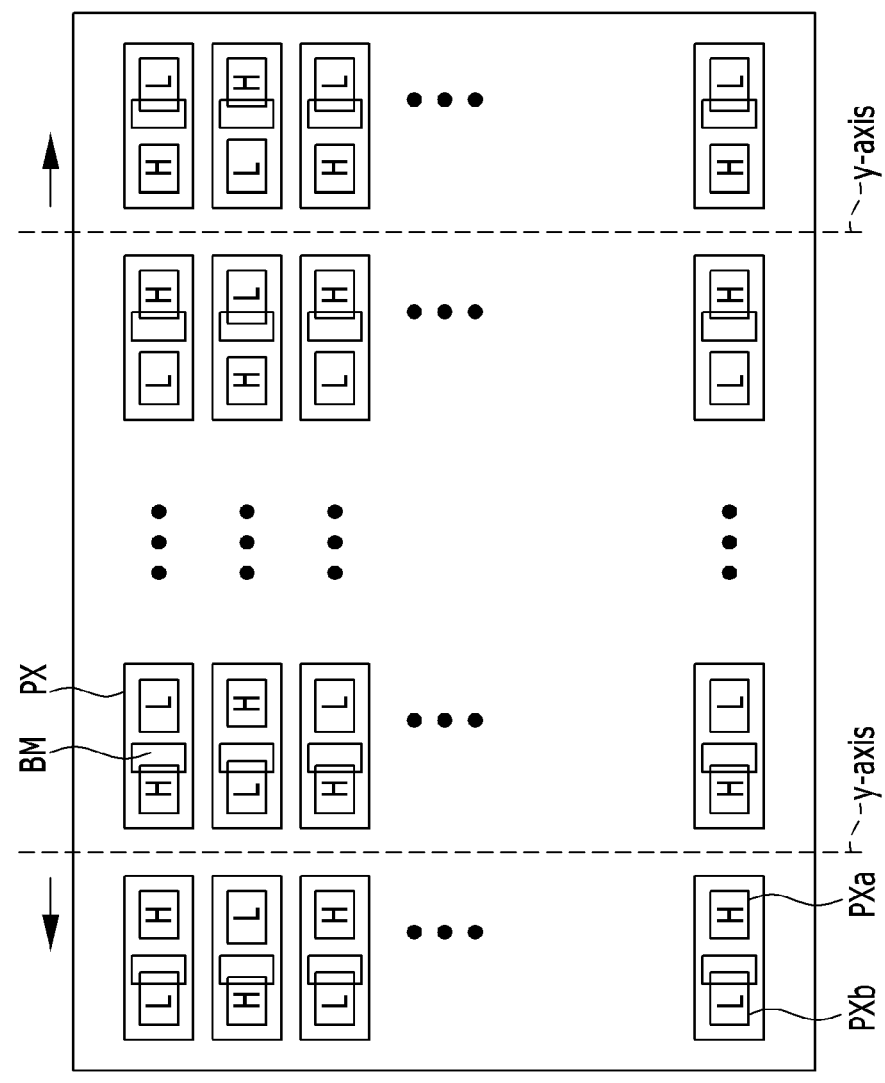

Hereinafter, a liquid display device according to another example embodiment will be described with reference to FIGS. 5 to 10. FIGS. 5 to 6 are schematic top plan views of a display device according to another example embodiment, and FIGS. 7 to 10 are circuit diagrams of one pixel according to another example embodiment.

First, another example embodiment will be described with reference to FIG. 5. In one pixel positioned in one column positioned in a left region of the display device, a high gray region H may be positioned in a right side of the light blocking member BM positioned in an extension direction of the data line, and a low gray region L may be positioned at a left side of the light blocking member BM. Further, in a plurality of pixels positioned on another column adjacent to the one column, the high gray region H may be positioned at a left side of the light blocking member BM, and the low gray region L may be positioned at a right side of the light blocking member BM. That is, the plurality of pixels positioned in the same row may be disposed to be symmetric to a y-axis.

A plurality of pixels positioned on the same column and the different rows will be described. In one pixel positioned in one row, the high gray region H may be positioned at the right side of the light blocking member BM, and the low gray region L may be positioned at the left side of the light blocking member BM. Further, in one pixel positioned in another row adjacent to the one row, the high gray region H may be positioned at the left side of the light blocking member BM, and the low gray region L may be positioned at the right side of the light blocking member BM. That is, the plurality of pixels positioned in the same column and the different rows may be disposed so that the high gray region H and the low gray region L are alternately positioned.

In the left region of the display device according to another example embodiment, a position of the light blocking member BM on the upper panel is shifted to the left and is not positioned precisely between the two regions L and H of the pixel PX, but is shifted to the left with respect to the position of the two regions of the pixel P.

In one column positioned in the left region among the plurality of pixels PX disposed in a matrix form, the light blocking member BM moved to the left partially overlaps the high gray region H positioned at the left side of the light blocking member BM. In the meantime, in one pixel positioned in the same column and another adjacent row, the light blocking member BM moved to the left partially overlaps the low gray region L positioned at the left side of the light blocking member 220.

That is, when the light blocking member BM is shifted to the left in the left region of a curved display device, the plurality of pixels disposed in the same column is disposed so that the high gray region H and the low gray region L are alternated, so that the light blocking member BM hides the high gray region H in one row and hides the low gray region L in another adjacent row.

In the right region of the display device, the a position of the light blocking member BM on the upper panel is shifted to the right, and is not positioned precisely between the two regions L and H of the pixel PX, but is shifted to the right with respect to the position of the two regions of the pixel P. In one column of the plurality of pixels positioned in the right region, the light blocking member BM moved to the right partially overlaps the high gray region H positioned at the right side of the light blocking member BM. Further, in one pixel positioned in the same column as the one column and another row adjacent to the one column, the light blocking member BM moved to the left partially overlaps the low gray region H positioned at the right side of the light blocking member BM.

Even when the light blocking member 220 is shifted to the right in the right region of a curved display device, the plurality of pixels disposed along the column is disposed so that the high gray region H and the low gray region L are symmetric to each other, so that the light blocking member 220 hides the low gray region L in one column and hides the high gray region H in another adjacent column.

Accordingly, when the display device is curved, the light blocking member 220 alternately hides the high gray region H and the low gray region L for the whole device, so that the display device may provide a generally uniform display quality.

Next, referring to FIG. 6, the light blocking member 220 according to another example embodiment may be independently formed for each one pixel PX.

The plurality of pixels PX according to another example embodiment may be disposed to be symmetric to the y-axis in the extension direction of the gate line as described above. For example, in one pixel positioned in one column, the high gray region H may be positioned at the right side of the light blocking member BM, and the low gray region L may be positioned at the left side of the light blocking member BM. Further, in another pixel positioned in another column adjacent to the one column, the high gray region H may be positioned at the left side of the light blocking member BM, and the low gray region L may be positioned at the right side of the light blocking member BM. As described above, the high gray region H and the low gray region L may be alternately disposed, and the plurality of pixels PX may be disposed to be symmetric to the y-axis.

Further, in the plurality of pixels PX positioned in the same column, in one pixel positioned in one row, the high gray region H is positioned at the right side of the light blocking member BM, and the low gray region L is positioned at the left side of the light blocking member BM. Further, in one pixel positioned in another row adjacent to the one row, the low gray region L may be positioned at the right side of the light blocking member BM, and the high gray region H may be positioned at the left side of the light blocking member BM.

That is, it can be seen that the high gray region H and the low gray region L included in one pixel PX are disposed to alternate in the extension direction of the gate line and the extension direction of the data line.

The light blocking member BM, which is individually formed for each region, in which the thin film transistor is formed, may be positioned in the plurality of pixels PX repeatedly disposed according to the aforementioned rule. When the high gray region H having a small area is formed at a right side of one pixel, the light blocking member BM may be biased to the right based on a center of one pixel, and when the high gray region H is formed at a left side of one pixel, the light blocking member BM may be biased to the left based on the center of one pixel.

FIGS. 7 to 10 are circuit diagrams of one pixel according to another example embodiment.

Figure 7:
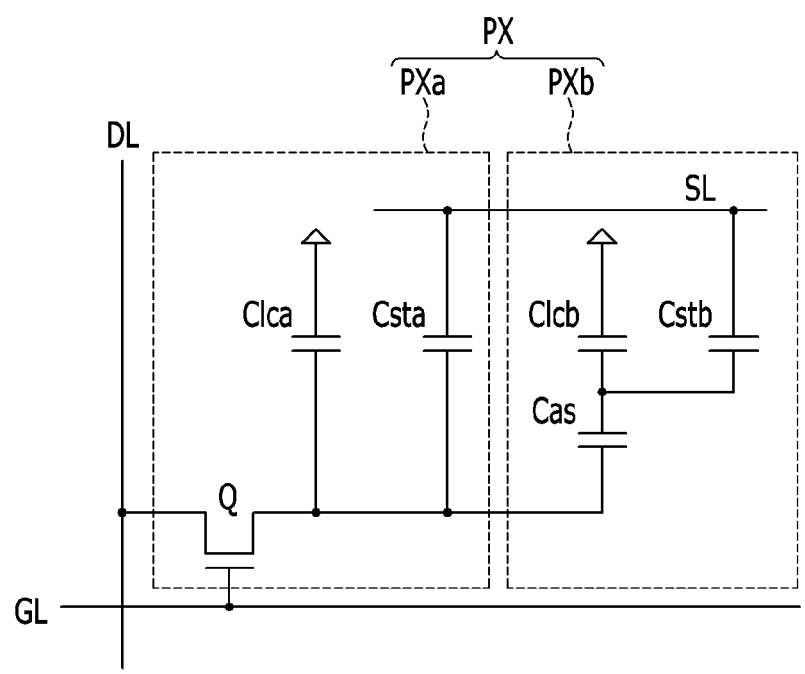
FIGS. 7, 8, 9, and 10 are circuit diagrams of one pixel according to another example embodiment.

Hereinafter, the example embodiment of FIG. 7 will be described.

The liquid crystal display according to an example embodiment includes a plurality of signal lines including a plurality of gate lines GL, a plurality of data lines DL, and a plurality of storage electrode lines SL, and a plurality of pixels PX connected to the plurality of signal lines. Each pixel PX includes a pair of first and second subpixels PXa and PXb, and a first subpixel electrode is formed in the first subpixel PXa and a second subpixel electrode is formed in the second subpixel PXb.

The liquid crystal display according to an example embodiment further includes a switching element Q connected to the gate line GL and the data line DL, a first liquid crystal capacitor Clca and a first storage capacitor Csta connected with the switching element Q and formed in the first subpixel PXa, which may be, for example, H-Sub a second liquid crystal capacitor Clcb and a second storage capacitor Cstb connected with the switching element Q and formed in the second subpixel PXb, which may be, for example, L-Sub, and an auxiliary capacitor Cas formed between the switching element Q and the second liquid crystal capacitor Clcb.

The switching element Q is a three-terminal element, such as a thin film transistor that is provided in the lower panel 100, a control terminal thereof is connected to the gate line GL, an input terminal thereof is connected to the data line DL, and an output terminal thereof is connected to the first liquid crystal capacitor Clca, the first storage capacitor Csta, and the auxiliary capacitor Cas.

One terminal of the auxiliary capacitor Cas is connected to the output terminal of the switching element Q, and the other terminal thereof is connected to the second liquid crystal capacitor Clcb and the second storage capacitor Cstb.

A charging voltage of the second liquid crystal capacitor Clcb is lower than a charging voltage of the first liquid crystal capacitor Clca by the auxiliary capacitor Cas, thereby improving side visibility of the liquid crystal display.

Hereinafter, an example embodiment of FIG. 8 will be described.

A liquid crystal display according to an example embodiment includes a plurality of signal lines including a plurality of gate lines GLn to GLN+1, a plurality of data lines DL, and a plurality of storage electrode lines SL, and a plurality of pixels PX connected to the plurality of signal lines. Each pixel PX includes a pair of first and second subpixels PXa, which may be, for example, H-Sub, and PXb, which may be, for example, L-Sub, and a first subpixel electrode is formed in the first subpixel PXa and a second subpixel electrode is formed in the second subpixel PXb.

The liquid crystal display according to an example embodiment further includes a first switching element Qa and a second switching element Qb connected to the gate line GLn and the data line DL, a first liquid crystal capacitor Clca and a first storage capacitor Csta connected with the first switching element Qa and formed in the first subpixel PXa, a second liquid crystal capacitor Clcb and a second storage capacitor Cstb connected with the second switching element Qb and formed in the second subpixel PXb, a third switching element Qc connected with the second switching element Qb and switched by the gate line GLn+1 of a next step, and an auxiliary capacitor Cas connected with the third switching element Qc.

The first switching element Qa and the second switching element Qb are three-terminal elements, such as a thin film transistor provided in a lower panel 100, and control terminals thereof are connected to the gate lines GL, input terminals thereof are connected to the data line DL, and output terminals thereof are connected to the first liquid crystal capacitor Clca and the first storage capacitor Csta, and the second liquid crystal capacitor Clcb and the second storage capacitor Cstb, respectively.

The third switching element Qc is also a three-terminal element, such as a thin film transistor provided in the lower panel 100, and a control terminal thereof is connected to the gate line GLn+1 of a next step, an input terminal thereof is connected to the second liquid crystal capacitor Clcb, and an output terminal thereof is connected to the auxiliary capacitor Cas.

One terminal of the auxiliary capacitor Cas is connected to the output terminal of the third switching element Qc, and the other terminal thereof is connected to the storage electrode line SL.

Figure 8:
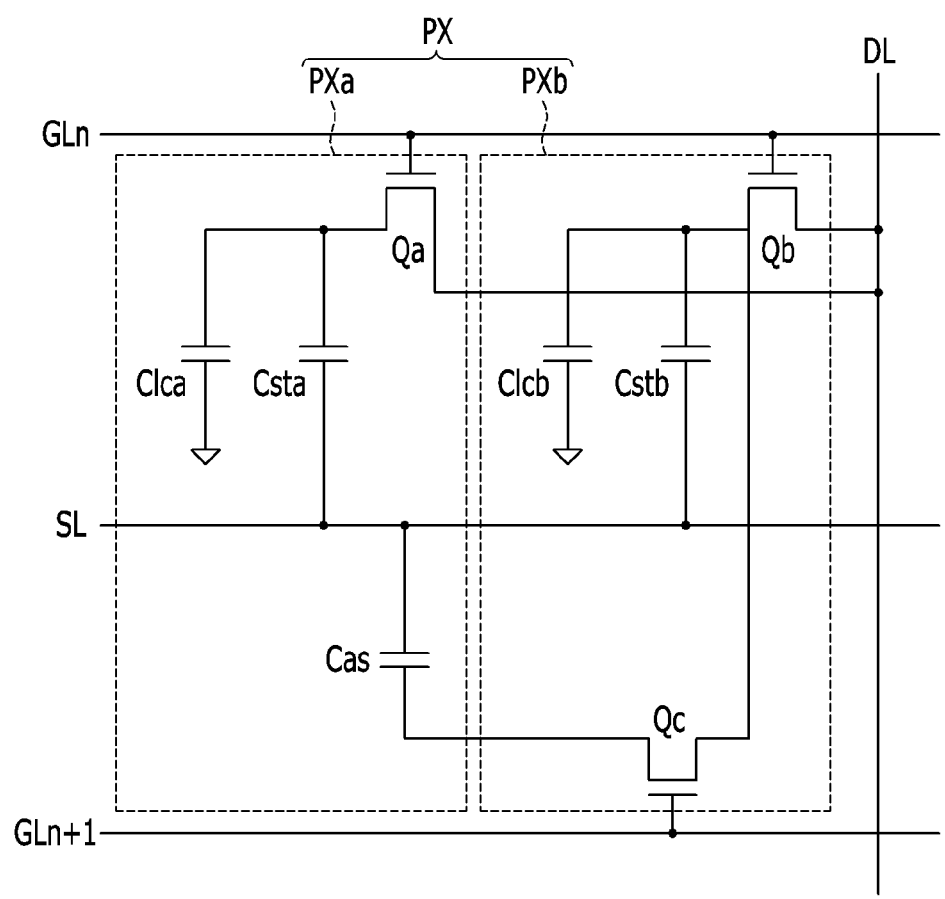

An operation of the liquid crystal display according to an example embodiment as shown in FIG. 8 will be described. When a gate-on voltage is applied to the gate line GLn, the first switching element Qa and the second switching element Qb connected to the gate line GLn are turned on, and a data voltage of the data line 171 is applied to the first and second subpixel electrodes.

Next, when a gate-off voltage is applied to the gate line GLn and the gate-on voltage is applied to the gate line GLn+1 of a next step, the first and second switching elements Qa and Qb are turned off and the third switching element Qc is turned on. Accordingly, charges of the second subpixel electrode connected with the output terminal of the second switching element Qb flows into the auxiliary capacitor Cas, so that a voltage of the second liquid crystal capacitor Clcb is decreased.

Accordingly, it is possible to improve side visibility of the liquid crystal display by making the charging voltages of the first and the second liquid crystal capacitors Clca and Clcb be different from each other.

Figure 9:
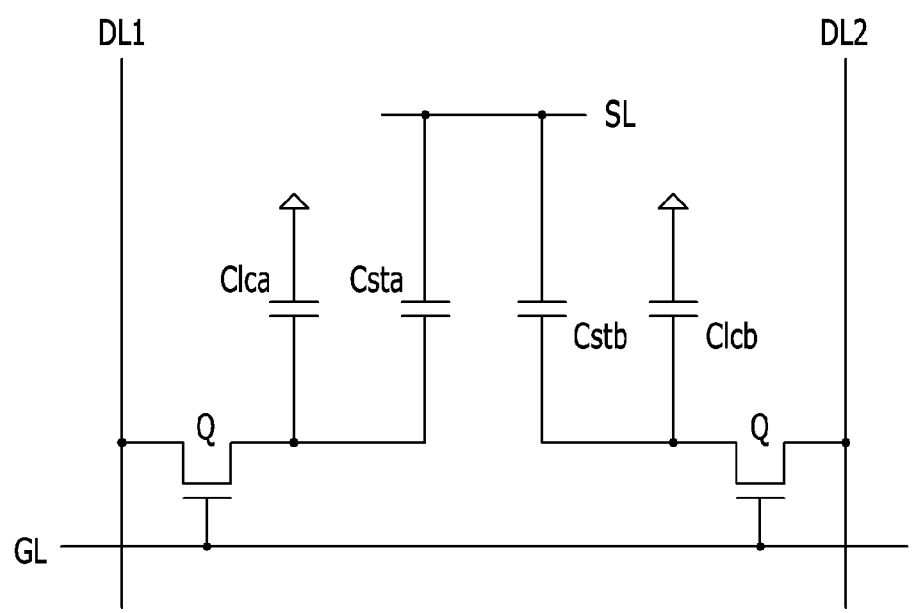

Hereinafter, an example embodiment of FIG. 9 will be described.

A liquid crystal display according to an example embodiment includes a plurality of signal lines including a plurality of gate lines GL, a plurality of data lines DL1 and DL2, and a plurality of storage electrode lines SL, and a plurality of pixels PX connected to the plurality of signal lines. Each pixel PX includes a pair of first and second liquid crystal capacitors Clca and Clcb and first and second storage capacitors Csta and Cstb.

Each subpixel includes one liquid crystal capacitor and one storage capacitor, and additionally includes one thin film transistor Q. The thin film transistors of the two subpixels included in one pixel are connected to the same gate line GL, but are connected to the different data lines DL1 and DL2. The different data lines DL1 and DL2 simultaneously apply data voltages having different levels, so that the first and second liquid crystal capacitors Clca and Clcb of the two subpixels have different charging voltages. As a result, it is possible to improve side visibility of the liquid crystal display.

Hereinafter, an example embodiment of FIG. 10 will be described.

Figure 10:
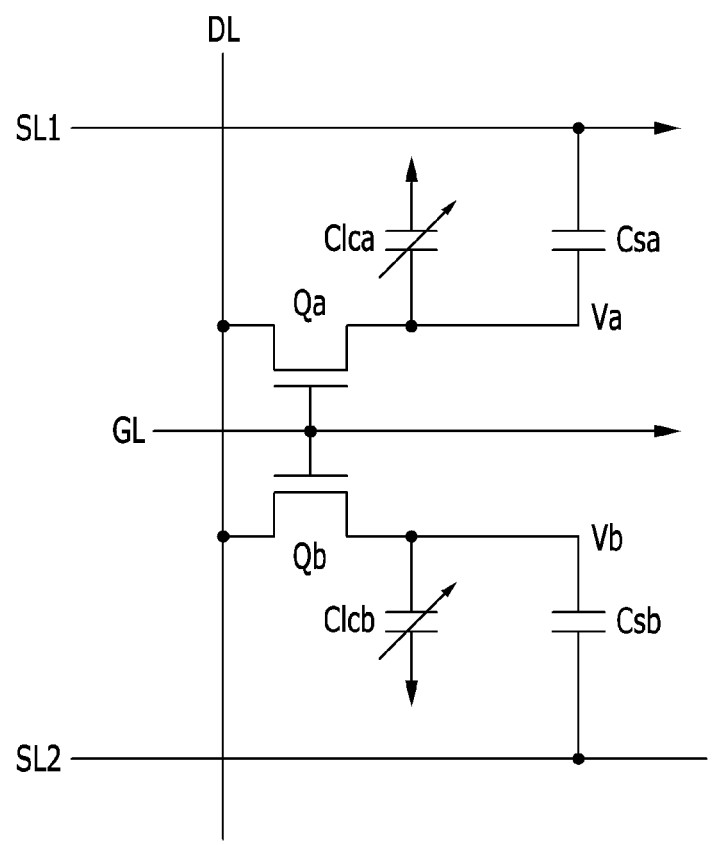

A liquid crystal display according to an example embodiment includes, as illustrated in FIG. 10, a gate line GL, a data line DL, a first power line SL1, a second power line SL2, and a first switching element Qa and a second switching element Qb connected to the gate line GL and the data line DL.

The liquid crystal display according to an example embodiment further includes an auxiliary step-up capacitor Csa and a first liquid crystal capacitor Clca connected to the first switching element Qa, and an auxiliary step-down capacitor Csb and a second liquid crystal capacitor Clcb connected to the second switching element Qb.

The first switching element Qa and the second switching element Qb are formed by three-terminal elements, such as a thin film transistor. The first switching element Qa and the second switching element Qb are connected to the same gate line GL and the same data line DL and turned on at the same time to output the same data signal.

A voltage having a form swinging at a predetermined period is applied to the first power line SL1 and the second power line SL2. A first low voltage is applied to the first power line SL1 for a predetermined period (for example, 1H) and a first high voltage is applied to the first power line SL1 for a next predetermined period. A second high voltage is applied to the second power line SL2 for a predetermined period, and a second low voltage is applied to the second power line SL2 for a next predetermined period. In this case, the first period and the second period are repeated several times during one frame, such that the swinging voltage is applied to the first power line SL1 and the second power line SL2. In this case, the first low voltage and the second low voltage may be the same as each other, and the first high voltage and the second high voltage may also be the same as each other.

The auxiliary step-up capacitor Csa is connected to the first switching element Qa and the first power line SL1, and the auxiliary step-down capacitor Csb is connected to the second switching element Qb and the second power line SL2.

A voltage Va of a terminal (hereinafter, referred to as "a first terminal") of a part at which the auxiliary step-up capacitor Csa is connected with the first switching element Qa is decreased when the first low voltage is applied to the first power line SL1, and is increased when the first high voltage is applied to the first power line SL1. Then, the voltage Va of the first terminal also swings according to the swing of the voltage of the first power line SL1.

Further, a voltage Vb of a terminal (hereinafter, referred to as "a second terminal") of a part at which the auxiliary step-down capacitor Csb is connected with the second switching element Qb is increased when the second high voltage is applied to the second power line SL2, and is decreased when the second low voltage is applied to the second power line SL2. Then, the voltage Vb of the second terminal also swings according to the swing of the voltage of the second power line SL2.

As described above, even though the same data voltage is applied to the two subpixels, the voltages Va and Vb of the pixel electrodes of the two subpixels are varied according to the sizes of the voltages swinging in the first and second power lines SL1 and SL2, so that transmittance of the two subpixels may be different and side visibility may be improved through the variation of the voltages of the pixel electrodes of the subpixels.

While this disclosure describes what is presently considered to be practical example embodiments, it is to be understood that the invention is not limited to the disclosed embodiments, but, on the contrary, is intended to cover various modifications and equivalent arrangements included within the spirit and scope of the disclosure, including the appended claims.

| <Description of symbols> | |
| --- | --- |
| 100: Lower panel | 200: Upper panel |
| 110, 210: Substrate | 191: Pixel electrode |
| 3: Liquid crystal layer | 31: Liquid crystal molecule |
| 11: Lower alignment layer | 21: Upper alignment layer |

What is claimed is:
1. A liquid crystal display, comprising:
a first insulating substrate;
a thin film transistor positioned on the first insulating substrate, and connected to a gate line and a data line which cross each other while being insulated;

a pixel electrode connected to the thin film transistor and comprising a first subpixel electrode and a second subpixel electrode;

a second insulating substrate overlapping the first insulating substrate;

a liquid crystal layer positioned between the first insulating substrate and the second insulating substrate, a plurality of light blocking members positioned between the second insulating substrate and the liquid crystal layer; and a common electrode positioned between the plurality of light blocking members and the liquid crystal layer;

wherein the first subpixel electrode and the second subpixel electrode are located along an extending direction of the gate line and are positioned while being spaced apart from each other based on the thin film transistor, and the plurality of light blocking members alternatively overlap one of the first subpixel electrode and the second subpixel electrode along the extending direction of the gate line.

2. The liquid crystal display of claim 1, wherein:
the liquid crystal display has a curved shape.

3. The liquid crystal display of claim 1, wherein:
the one pixel positioned in one column is disposed to be symmetric to the one pixel positioned in another adjacent column in the y-axis.

4. The liquid crystal display of claim 1, wherein:
the first subpixel electrode and the second subpixel electrode are alternately disposed.

5. The liquid crystal display of claim 4, wherein:
the light blocking member positioned in one column overlaps the second subpixel electrode, and the light blocking member positioned in another adjacent column overlaps the first subpixel electrode.

6. The liquid crystal display of claim 1, wherein:
the first subpixel electrode positioned in one row is positioned at one side of the data line, and the first subpixel electrode positioned in another adjacent row is positioned at the other side of the data line.

7. The liquid crystal display of claim 1, wherein:
the light blocking members adjacent in the extension direction of the data line are connected with each other.

8. The liquid crystal display of claim 1, wherein:
the light blocking member is independently disposed for each pixel.

9. The liquid crystal display of claim 8, wherein:
the light blocking member is positioned while overlapping the thin film transistor.

10. The liquid crystal display of claim 1, further comprising:
color filters positioned on the second insulating substrate, and having the same color in the extension direction of the gate line.

11. The liquid crystal display of claim 10, further comprising:
an overcoat positioned on the color filter and the light blocking member.

* * * * *